Patented Feb. 10, 1942

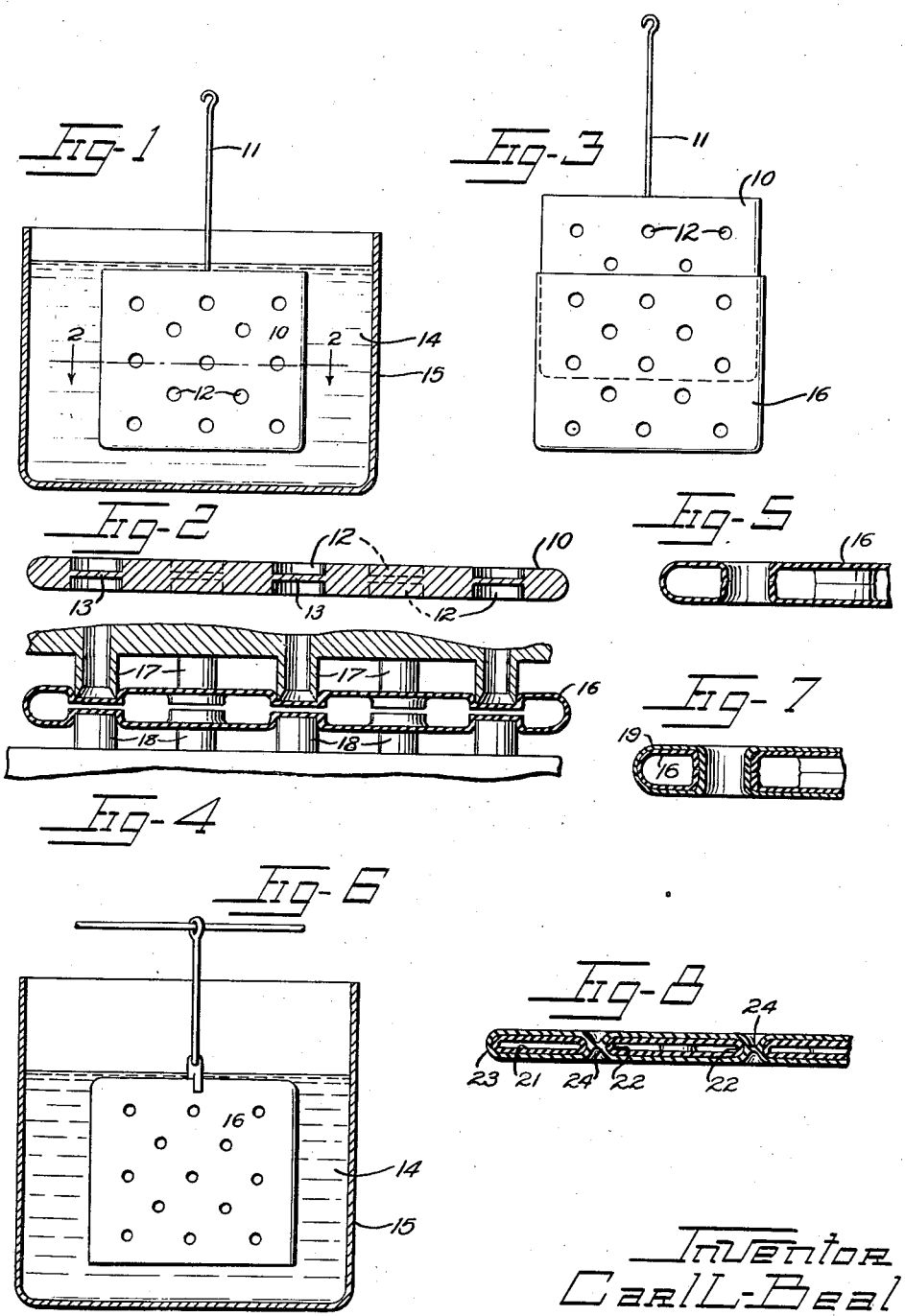

2,272,290

UNITED STATES PATENT OFFICE 2,272,290

RUBBER ARTICLE AND METHOD FOR MAKING THE SAME

Carl L. Beal, Cuyahoga Falls, Ohio, assignor to American Anode, Inc., Akron, Ohio, a corporation of Delaware Application August 26, 1937, Serial No. 161,054

19 Claims. (Cl. 18—58)

This invention relates to the manufacture of rubber articles and especially to the manufacture of inflatable hollow rubber articles such as pneumatic cushions having opposed walls locally connected between the margins to prevent undue distension of the cushion upon inflation, and in which the local connecting means between the opposed walls preferably take the form of tubes providing ventilating openings through the cushion.

It is highly desirable that articles of the character described should have an integral continuous rubber structure, especially in the cushioning zone, to provide maximum strength and durability, but conventional methods of manufacture cannot be used to produce such articles in integral form because the connections between the faces prevent removal of the mandrel or form which ordinarily is required in making integral hollow articles. It has been proposed to use a destructible mandrel or form such as a paper form for such purposes, but the destruction of the form and the removal of the residue is a tedious and costly job and an operator can rarely be certain that all the destroyed form has been removed so that portions frequently are left within the cushion with undesirable consequences. Furthermore, the cost of a new form for each article made is not an inconsequential item. In my copending application Serial No. 115,240, filed December 10, 1936, which now has matured into U. S. Patent No. 2,272,289, granted concurrently herewith on February 10, 1942, I have described the use of a sectional metal form for making apertured pneumatic cushions and the like, and while this expedient has proved to be quite satisfactory, it is open to the objection that the rubber usually must be stretched somewhat while still unvulcanized to permit removal of the form sections, which in some cases has resulted in undesirable distortion of the incomplete cushion.

The present invention accordingly has for its objects the provision of a simple, economical and efficient method for making apertured and "tufted" hollow rubber cushions with an integral continuous rubber structure; to provide a novel deposition form for use in such method; to provide novel and dependable constructions in hollow rubber articles such as apertured and "tufted" cushions and generally to provide economy and efficiency in the manufacture of rubber articles.

The manner in which these and other objects of the invention are achieved will be evident from the following description of the invention as illustrated in the accompanying drawing, of which Fig. 1 is a sectional elevation showing a deposition form immersed in a liquid rubber composition for receiving a coating of rubber;

Fig. 2 is a vertical section taken on line 2—2 of Fig. 1;

Fig. 3 is an elevation showing the rubber coating being stripped from the form of Fig. 1;

Fig. 4 is an elevation, partially sectioned for clarity of illustration, showing an intermediate step in the process;

Fig. 5 is a fragmentary vertical section of the intermediate product produced by the operation illustrated in Fig. 4;

Fig. 6 is a vertical section illustrating a further step in the process and showing the intermediate product immersed in a liquid rubber composition;

Fig. 7 is a fragmentary vertical section of the final product.

Fig. 8 is a fragmentary vertical section of a final product made by a slightly different procedure embodying the present invention in a modified form.

In the preferred method of the present invention, I use a deposition form 10 of, for example, generally rectangular, planar configuration provided with a supporting handle 11, and formed of a suitable non-corrodible metal such as aluminum. A number of circular depressions 12, 12, preferably are provided in each face of the planar form 10, the depressions being suitably spaced apart in opposed pairs with a portion of the form material remaining to form a thin wall 13 between the bottoms of opposed depressions of each pair as more clearly shown in Fig. 2.

In the process, the form 10 is immersed in a liquid rubber composition 14 contained in a tank 15, and an enveloping coating of rubber is deposited upon the form in any well known manner. Preferably however, the liquid rubber composition 14 should be an aqueous dispersion of unvulcanized rubber such as natural rubber latex compounded with the usual vulcanizing and conditioning ingredients, in which case, the form 10 may advantageously be coated with a coagulant for the aqueous dispersion and also with a pulverulent separating material as described in U. S. Patent No. 1,924,214 to expedite deposition of the rubber coating and to facilitate stripping the coating from the form.

After the deposited rubber coating has been dried sufficiently to permit handling, but before it is vulcanized, a slit is made along one edge of the coating to permit stripping the coating from the form as shown in Fig. 3, thereby to produce a flat rubber bag 16 having opposed depressions molded in its walls corresponding to the depressions 12, 12 in the form 10.

The bottoms of the depressions in the rubber bag 16 are then died out and the adjacent edges of the opposed rubber bag walls are simultaneously cut-seamed by means of conventional clicking dies 17, 17 operating against cooperating anvils 18, 18 to produce a bag having apertures therein as shown in Fig. 5.

To reenforce the cut-seamed edges at the apertures, and to insure an integral, one-piece, continuous and therefore thoroughly dependable construction, the bag 16 is then preferably immersed in the liquid rubber composition 14, as shown in Fig. 6, one or more times to deposit a second enveloping coating of rubber 19 over all portions of the bag thereby to provide a seamless structure at the apertures and at the same time to seal the slit which was previously made in the edge of the bag 16. Desirably, although not necessarily, the edges of the slit may be locally coated with a solvent solution of rubber commonly called a rubber cement, prior to application of the final sealing coating of rubber, in order to secure most satisfactory sealing. In some cases, the final enveloping coating of rubber may be omitted, the unreenforced cut-seam having sufficient strength, after vulcanization, to withstand considerable service. Or in another modification, a local reenforcing deposit or strip of rubber may be applied to the cut-seams as by brushing latex thereon.

To complete the cushion, the rubber is vulcanized and a conventional inflating valve is provided at any desired location, all according to usual practice and requiring no detailed explanation.

In a slightly modified procedure which may advantageously be used for making relatively thin cushions, I may use a plane deposition form without depressions, and produce in the manner described a rubber bag having smooth faces, then die out openings in the two faces and simultaneously cut-seam the adjacent edges, and apply an overall enveloping coating of rubber to produce an integral structure as before. If the openings died out in either process are small, for example, about 0.25 inch in diameter or less, and no preventive precautions are taken, the liquid rubber composition will web over the openings when the final coating of rubber is applied, especially when using an aqueous dispersion of rubber, and will produce webs closing the apertures in the cushion. A cushion made by such a modified procedure is illustrated in Fig. 8 in which the numeral 21 indicates the initial rubber bag made on a smooth form in which openings have been died and the edges cut-seamed at 22, 22, and the bag then immersed in latex one or more times to apply a second enveloping coating of rubber 23, and in which the latex has webbed over the apertures to produce webs 24, 24. When such a cushion is inflated, it will assume a "tufted" appearance, rather than the apertured appearance of the cushion of Fig. 7.

For clarity of illustration, the two coats of rubber, designated by the numerals 15 and 18 in the first example and by the numerals 21 and 23 in the second example, have been shown as two separate distinct layers of rubber, but it is to be understood that upon vulcanization, the two layers merge and blend into an integral body of rubber, although the cut-seams will still be evident.

By the procedures described I am able to produce, with minimum expense, inflatable hollow cushions provided with any desired number of distension limiting connections between the cushion faces, either in the form of tubes providing ventilation for the cushion, or in the form of depressions terminating in a web and producing "tufts," and to insure in either type cushion an integral continuous rubber structure providing maximum strength and durability. The invention therefore attains to a high degree the objects set forth.

Numerous modifications and variations in details of the procedure as herein described may be made without departing from the spirit and scope of the invention as defined by the appended claims.

I claim:

1. The method of making a rubber article having opposed walls integrally connected between the margins of the article, which comprises bringing together two sheets of unvulcanized rubber adapted to constitute opposed faces of the finished article, cut-seaming the two sheets together at a point between the margins thereof, applying a coating of a liquid rubber composition to the cut-seam and contiguous areas, solidifying the liquid rubber composition to produce a sealing coating of rubber, and vulcanizing the rubber.

2. The method of making a hollow rubber article having opposed walls integrally connected between the margins of the article, which comprises producing a rubber bag having two opposed walls and an opening in the bag, cut-seaming the walls together at a point spaced from said opening and between the margins of the walls, coating substantially the entire bag with a liquid rubber composition and solidfying the liquid composition to produce a coating of rubber sealing the opening in the bag and reenforcing the cut-seam.

3. The method of making a hollow rubber article having opposed walls integrally connected between the margins of the article, which comprises producing a rubber bag having two opposed walls and an opening at a margin of the bag, cutting aligned localized portions from the two walls and simultaneously cut-seaming the adjacent edges, and applying a sealing coating of rubber to portions of the bag including the cut-seam and the opening in the bag.

4. The method of making a hollow rubber article having opposed walls integrally connected between the margins of the article, which comprises producing a rubber bag having a wall with a molded depression therein and a second wall opposed to the first wall, cutting one opening in the depression wall and a second opening in an aligned portion of the opposed wall and simultaneously cut-seaming the rubber at the cut edges of the two walls.

5. The method of making a hollow rubber article having opposed walls integrally connected between the margins of the article, which comprises producing a rubber bag having a wall with a molded depression therein and a second wall opposed to the first wall, cutting one opening in the depression wall, a second opening in an aligned portion of the opposed wall and simultaneously cut-seaming the rubber at the cut edges of the two walls, and applying a sealing coating of rubber to the cut-seam and contiguous areas.

6. The method of making a hollow rubber article having opposed walls integrally connected between the margins of the article, which comprises producing a rubber bag having opposed walls provided with opposed molded depressions, cutting openings in the opposed depressions and simultaneously cut-seaming the rubber at the cut edges of the two walls.

7. The method of making a hollow rubber article having opposed walls integrally connected between the margins of the article, which comprises producing a rubber bag having opposed walls provided with opposed molded depressions, cutting openings in the opposed depressions and simultaneously cut-seaming the rubber at the cut edges of the two walls, and applying a sealing coating of rubber to the cut-seam and contiguous areas.

8. The method of making an inflatable hollow rubber article having opposed walls integrally connected between the margins of the article, which comprises providing a deposition form having the general shape of the desired article, producing upon the form an enveloping coating of rubber, slitting the rubber coat, removing the form through the slit, cut-seaming opposed portions of the coating together at a point between the margins thereof, applying a liquid rubber composition to the cut-seam and to the slit and solidifying the liquid rubber composition.

9. The method of making a hollow rubber article having opposed walls integrally connected between the margins of the article, which comprises providing a deposition form having a depression where the integral connection is desired in the rubber article, producing, by deposition from a liquid rubber composition, upon the form including the depression a coating of rubber having a wall with a molded depression and an opposed wall, stripping the rubber from the form, cutting an opening in the wall depression and in an aligned portion of the opposed wall and simultaneously cut-seaming the rubber at the cut edges.

10. The method of making a hollow rubber article having opposed walls integrally connected between the margins of the article, which comprises providing a deposition form having opposed depressions in two faces thereof where the integral connection is desired in the rubber article, depositing rubber from a liquid rubber composition upon the form to produce thereon a coating of rubber constituting a bag having opposed molded depressions in the walls thereof, stripping the bag from the form, cutting openings in the opposed depressions and simultaneously cut-seaming the rubber at the cut-edges.

11. The method of making an inflatable hollow rubber article having opposed walls integrally connected between the margins of the article, which comprises providing a deposition form having opposed depressions in the faces thereof where the integral connection is desired in the rubber article, depositing rubber from a liquid rubber composition upon the form to produce thereon an enveloping coating of rubber having faces provided with opposed molded depressions, slitting the coating, removing the form through the slit, cutting openings in the opposed depressions in the rubber and simultaneously cut-seaming the rubber at the cut-edges, applying a liquid rubber composition to the cut-seam and to the slit, and solidifying the liquid rubber composition.

12. The method of making an inflatable hollow rubber article having opposed walls integrally connected between the margins of the article, which comprises providing a deposition form having opposed depressions in the faces thereof where the integral connection is desired in the rubber article, depositing rubber from a liquid composition upon the form to produce thereon an enveloping coating of rubber, slitting the coating, removing the form through the slit, cutting openings in the opposed depressions and simultaneously cut-seaming the rubber at the cut edges, immersing the entire article in a liquid rubber composition and solidifying the composition to form a sealing deposit of rubber.

13. The method of making a "tufted" hollow rubber article which comprises producing a hollow article having opposed walls, cutting small aligned openings in the opposed walls and simultaneously cut-seaming the rubber at the cut edges, immersing the article in a liquid rubber composition which will web over the small openings, and drying the resulting rubber coating and webs.

14. The method of making a hollow rubber article of complicated structure preventing removal of a form from the finished article, which comprises providing a form designed to produce the general hollow structure but not the obstructing portions of the final article, producing a deposit of rubber upon the form, removing the deposit from the form, cutting and seaming the deposit to produce the desired structure, and immersing the deposit in a liquid rubber composition to produce a sealing and reenforcing coating of rubber thereon.

15. A hollow rubber article having opposed walls integrally connected between the margins of the article, comprising a hollow body of rubber having opposed walls locally cut-seamed at a point between the margins thereof and a seamless coating of rubber overlying the cut-seam and adjacent areas and being integrally bonded to the said body of rubber.

16. A hollow rubber article having opposed walls integrally connected between the margins of the article, comprising a hollow body of rubber having opposed walls locally cut-seamed at a point between the margins thereof, and a seamless coating of rubber enveloping the said body and being integrally bonded thereto.

17. A hollow rubber article comprising opposed sheet faces joined by at least one tubular connector disposed between the margins of the article, the structure of said article being essentially integral and presenting a seamless exterior surface in the region of the tubular connector, the structure comprising inner walls cut-seamed together in the region of the tubular connector and an outer wall comprising a seamless coating of rubber overlying the cut-seam and adjacent areas and being integrally bonded to the rubber of the inner walls.

18. The method of making a hollow rubber article comprising opposed sheet faces joined by at least one tubular connector disposed between the margins of the article, which comprises producing a rubber bag having opposed sheet walls, cut-seaming the opposed walls together along a generally circular line and simultaneously severing wall material from both walls within the circular line to form a tubular connector between the walls, and coating at least a portion of the tubular connector including the cut-seam and adjacent areas with a liquid rubber composition and solidifying the composition.

19. The method of making a rubber article which comprises forming two portions of the article by depositing rubber from a liquid rubber composition, cut-seaming the two portions together in a determinate zone, coating at least a substantial part of said zone including the cut-seam with a liquid rubber composition, and solidifying the composition to form an adherent coating overlying the cut-seam.

CARL L. BEAL.